United States Patent
Kohno et al.

(10) Patent No.: US 7,777,422 B2
(45) Date of Patent: Aug. 17, 2010

(54) DC/DC CONVERTER DEVICE AND DISCHARGE LAMP LIGHTING DEVICE

(75) Inventors: Yasuhiko Kohno, Tokyo (JP); Takashi Ohsawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 319 days.

(21) Appl. No.: 11/922,852

(22) PCT Filed: May 31, 2006

(86) PCT No.: PCT/JP2006/310916

§ 371 (c)(1),
(2), (4) Date: Dec. 26, 2007

(87) PCT Pub. No.: WO2007/023603

PCT Pub. Date: Mar. 1, 2007

(65) Prior Publication Data

US 2009/0108767 A1    Apr. 30, 2009

(30) Foreign Application Priority Data

Aug. 24, 2005   (JP) ............................. 2005-242738

(51) Int. Cl.
    H05B 37/02    (2006.01)
    H02J 1/10     (2006.01)
(52) U.S. Cl. ...................... 315/209 R; 363/65; 315/360
(58) Field of Classification Search ................ 315/194, 315/209 R, 219–221, 223–226, 209 CD, 315/209 M, 276–277, 291, 307, 360, DIG. 7; 363/65
See application file for complete search history.

(56) References Cited

U.S. PATENT DOCUMENTS

| | | | | |
|---|---|---|---|---|
| 4,695,933 | A | * | 9/1987 | Nguyen et al. ................ 363/17 |
| 5,946,206 | A | * | 8/1999 | Shimizu et al. .............. 363/65 |
| 6,970,366 | B2 | * | 11/2005 | Apeland et al. ............ 363/132 |
| 2003/0095421 | A1 | | 5/2003 | Kadatskyy et al. |
| 2004/0233685 | A1 | | 11/2004 | Matsuo et al. |
| 2004/0246750 | A1 | | 12/2004 | Ichikawa et al. |

FOREIGN PATENT DOCUMENTS

| | | | |
|---|---|---|---|
| JP | 1-114365 | A | 5/1989 |
| JP | 2000-12273 | A | 1/2000 |
| JP | 2002-117995 | A | 4/2002 |
| JP | 2003-59688 | A | 2/2003 |
| JP | 2004-260993 | A | 9/2004 |
| JP | 2004-274864 | A | 9/2004 |
| JP | 2004-364433 | A | 12/2004 |
| JP | 2005-20904 | A | 1/2005 |
| JP | 2005-73431 | A | 3/2005 |
| JP | 2005-198438 | A | 7/2005 |
| WO | WO-2006/029323 | A2 | 3/2006 |

* cited by examiner

*Primary Examiner*—Thuy Vinh Tran
(74) *Attorney, Agent, or Firm*—Birch, Stewart, Kolasch & Birch, LLP

(57) ABSTRACT

A DC/DC converter device according to the present invention includes a plurality of resonant DC/DC converters connected in parallel, and a timing control circuit driving the plurality of resonant DC/DC converters at substantially the same frequency with a phase shift.

7 Claims, 12 Drawing Sheets

DC/DC CONVERTER DEVICE AND DISCHARGE LAMP LIGHTING DEVICE

This Application is a National Phase application filed under 35 USC 371 claiming the benefit of an international application PCT/JP2006/310916 filed on May 31, 2006, having a priority benefit of a foreign application JP 2005-242738 filed on Aug. 24, 2005.

TECHNICAL FIELD

The present invention relates to a DC/DC converter device well adapted for installation on vehicles or the like, and a discharge lamp lighting device with the DC/DC converter device.

BACKGROUND ART

This type of conventional converters include a converter where a plurality of small-capacity DC/DC converters are connected in parallel, and are operated in parallel with shifting each operating phase of these converters in order to compose a single DC/DC converter (see Patent Document 1, for example).

Further, known converters include a converter where a DC-DC converter is operated synchronously with the resonance of a coil capacitor circuit containing the inductance of a transformer of the DC/DC converter by detecting the current applied to the transformer or the voltage of the node between a switching device and the transformer to detect the time point when the current becomes 0 A or the time point when the voltage becomes 0 V (see Patent Document 2, for example).

Furthermore, there is known a discharge lamp lighting apparatus where a discharge lamp lighting device is constructed by using a DC/DC converter resonating as in the case of the above Patent Document 2, and the power output to the discharge lamp is controlled by changing the drive frequency thereof by means of PFM (Pulse Frequency Modulation) by using the resonance produced by the leakage reactor of a transformer and a capacitor (see Patent Document 3, for example).

Moreover, a discharge lamp lighting device developed from the idea of the Patent Document 3 has conventionally been known, in which a DC/DC converter producing a resonance that is PMF-controlled as in the case of the above Patent Document 2 is employed, and further in the state just before the discharge lamp lights, the control by the resonance is released to control the device by the usual operation of the DC/DC converter (see Patent Document 4, for example).

Patent Document 1: JP-A-2000-012273

Patent Document 2: JP-A-1-114365

Patent Document 3: JP-A-2002-117995

Patent Document 4: JP-A-2003-059688

In the conventional device disclosed in the above-mentioned Patent Document 1, since a PWM waveform is generated by using a single triangular wave generator, two DC/DC converters shifted 180° from each other in phase (a multiphase DC/DC converter of two phases) can be easily constructed, ripple can be lowered, the efficiency thereof is high, and the noise thereof is low. However, because both the transformers thereof are driven at the same frequency and with the same duty ratio, both the transformers cannot simultaneously resonate (the resonances of individual transformers are different from each other according to their element variations), and besides, the conventional device cannot be developed to a resonant DC/DC converter achieving efficiency improvement and noise reduction In the case of the conventional device disclosed in the Patent Document 2, the device includes a single DC/DC converter having a simple structure, also with high efficiency and low noise. However, since the device has a single configuration, its ripple is large, and its filter has to be reinforced to reduce the ripple. Additionally, because a resonance is produced by the inductance of a transformer and a capacitor, if a plurality of devices are simply operated in parallel, their frequencies tend to be different from each other, and the devices cannot be adjusted in phase.

Further, in the case of the conventional device disclosed in Patent Document 3, a discharge lamp lighting device is composed of a single DC/DC converter, and a resonant DC/DC converter is employed to reduce the switching loss. However, since a leakage reactor is used, its inductance becomes smaller than the inductance of the primary winding of the transformer, and the capacitor for resonance cannot but become large. Moreover, because of the single DC/DC converter, the filter for reducing ripple cannot but become large. Additionally, the PFM control thereof becomes more complex in the circuit structure than a PFM control controlling the ON-time of a switching device by using a triangular wave, and therefore, is not suitable for a simple small ballast.

Furthermore, in the case of the conventional device disclosed in the Patent Document 4, since a lighting device is composed of a single DC/DC converter as in the case of the device disclosed in the above third patent document, the filter for reducing ripple cannot but be designed large. Besides, even when a high power is introduced immediately after lighting, as well as at the timing before lighting, as shown in this Document, the release of control by the resonance may be required.

In addition, in order to increase the efficiency of a DC/DC converter and reduce noise generation, the idea of combining the devices disclosed in the above first and second paten documents is seemingly easy; however, development to the resonant operation from the device disclosed in the above first patent document cannot be expected. Even if independent DC/DC converters are operated in parallel with the devices as disclosed in the above second patent document, the operating frequencies is different from each other, and therefore, the advantage of the parallel operation cannot be effected.

The present invention has been made to solve the above-mentioned problems. Objects of the present invention are to provide a DC/DC converter device capable of causing DC/DC converters each having an individual resonant frequency because of their characteristic variations or the like to operate at the same frequency shifted in phase and making the best use of the advantages of resonant operation and parallel operation, and to provide a discharge lamp lighting device using the DC/DC converter device.

DISCLOSURE OF THE INVENTION

The DC/DC converter device according to the present invention includes a plurality of resonant DC/DC converters of which the resonant frequencies are different from each other because of their character variations or the like and which are connected in parallel, and a timing control means for driving the plurality of resonant DC/DC converters at substantially the same frequency with a phase shift.

Further, the discharge lamp lighting device according to the present invention includes a timing control means for driving a plurality of resonant DC/DC converters at substantially the same frequency with a phase shift, and an H-type bridge circuit and an igniter circuit that supply the electric power supplied by the DC/DC converter device to a high-intensity discharge lamp.

The present invention is able to reduce ripple on both the input and output of the converter, reduce the capacitance of a capacitor for a filter, and reduce the noise generated by the ripple. Besides, the present invention is able to secure the lighting of a high-intensity discharge lamp.

BEST MODE FOR CARRYING OUT THE INVENTION

Embodiments of the present invention will now be described with reference to the accompanying drawings in order to explain the present invention in more detail.

First Embodiment

Figure 1:
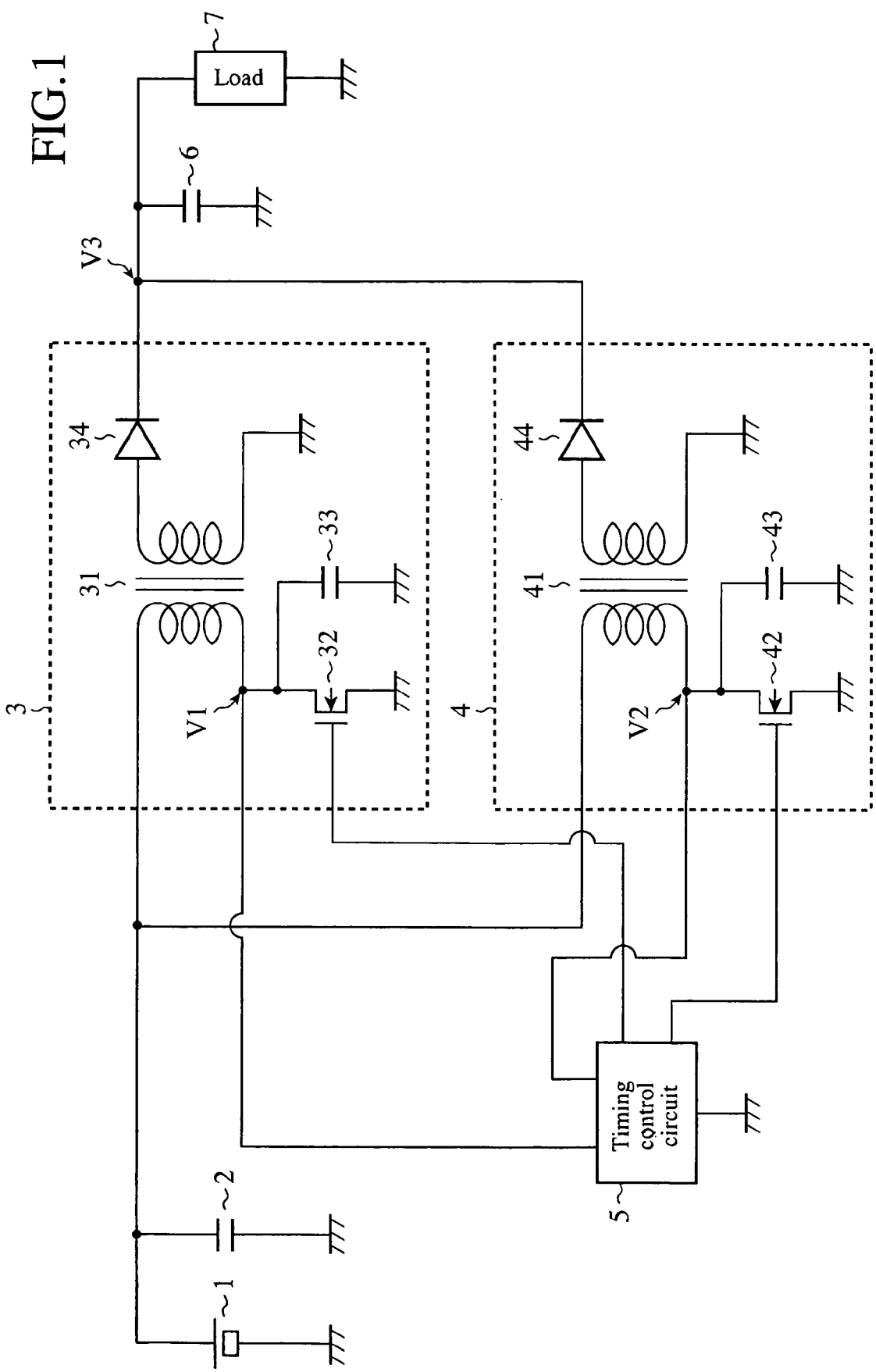
FIG. 1 is a block diagram showing a DC/DC converter device according to the first embodiment of the present invention.

FIG. 1 is a block diagram showing a DC/DC converter device according to the first embodiment of the present invention.

In FIG. 1, a plurality of DC/DC converters 3, 4 are connected in parallel through a capacitor 2 connected in parallel with the two terminals of a battery 1, and a timing control circuit 5 is provided for the DC/DC converters 3, 4, and serves as a timing control means for controlling the ON/OFF timings of switching elements 32, 42 of the DC/DC converters 3, 4, respectively. Then, a load 7 is connected with the output side of the DC/DC converters 3, 4 through a capacitor 6.

Both one sides of the primary windings of a transformer 31 of the DC/DC converter 3 and a transformer 41 of the DC/DC converter 4 are connected with the positive side of the battery 1, and the other sides thereof are connected with the positive electrode (drain terminal) sides of the switching elements 32, 42, respectively, and are grounded through capacitors 33, 43, respectively.

Further, one sides of the secondary windings of the transformer 31 of the DC/DC converter 3 and the transformer 41 of the DC/DC converter 4 are connected with the load 7 with which a capacitor 6 is connected in parallel through diodes 34, 44, respectively, and the other sides thereof are grounded. In addition, the timing control circuit 5 receives, as signals, the voltages V1, V2 of the nodes of the switching elements 32, 42 connected between the other sides of the primary windings of the transformer 31 of the DC/DC converter 3 and the transformer 41 of the DC/DC converter 4, and the ground, and the timing control circuit is connected with the control electrodes (gate terminals) of the switching elements 32, 42 connected between the other sides of the primary windings of the transformer 31 of the DC/DC converter 3 and the transformer 41 of the DC/DC converter 4, and the ground.

Figure 2:
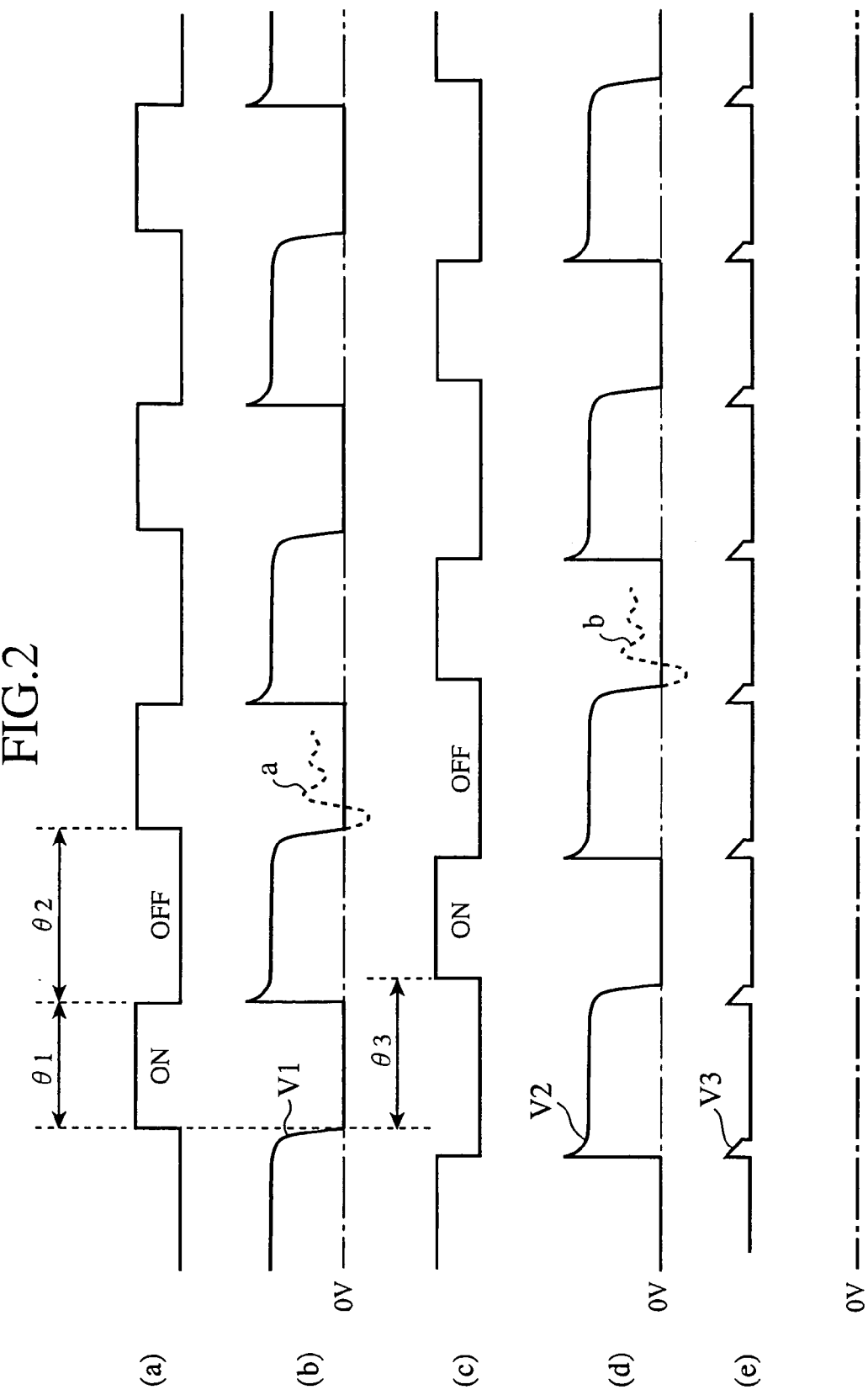
FIG. 2a-2e shows timing charts for explaining an operation of the DC/DC converter device according to the first embodiment of the present invention.

The operation will now be described with reference to timing charts in FIG. 2.

In the present embodiment, the plurality of resonant DC/DC converters are driven at substantially the same frequency, shifted from each other in phase. As shown in FIG. 2(a), when the switching element 32 is turned on by the timing control circuit 5, and thereby magnetic energy is injected into the transformer 31 for only period θ1, the DC/DC converter 3 obtains a voltage V1 of 0 V, as shown in FIG. 2(b), on the other side of the primary winding of the transformer 31, that is, on the positive electrode side of the switching element 32. Contrarily, when the switching element 32 is turned off, and thereby the magnetic energy of the transformer 31 is released only for period θ2, the DC/DC converter obtains a voltage V1 of a predetermined level exceeding the power source voltage, as shown in FIG. 2(b), on the positive electrode side of the switching element 32, which is the other side of the primary winding of the transformer 31.

Similarly, as shown in FIG. 2(c), when the switching element 42 is turned on, shifted from the DC/DC converter 3 in phase by only period θ3 by the timing control circuit 5, and thereby magnetic energy is injected into the transformer 41 only for period θ1, the DC/DC converter 4 obtains a voltage V2 of 0 V, as shown in FIG. 2(d), on the other side of the primary winding of the transformer 41, that is, on the positive electrode side of the switching element 42. Contrarily, when the switching element 42 is turned off, and thereby the magnetic energy of the transformer 41 is released only for period θ2, the DC/DC converter obtains a voltage V2 of a predetermined level exceeding the power source voltage, as shown in FIG. 2(d), on the positive electrode side of the switching element 42, which is the other side of the primary winding of the transformer 41.

In this connection, the waveforms shown by dashed lines a and b in FIG. 2(b) and FIG. 2(d) represent the waveforms by so-called resonant operations, and when the V1 and V2 come to 0 V by resonance, the switching elements 32, 42 are switched from OFF to ON by the timing control circuit 5.

Thus, on the output side of the DC/DC converters 3, 4, in other words, on the common output side of the diodes 34, 44, an output voltage V3 as shown in FIG. 2E is output.

Figure 3:
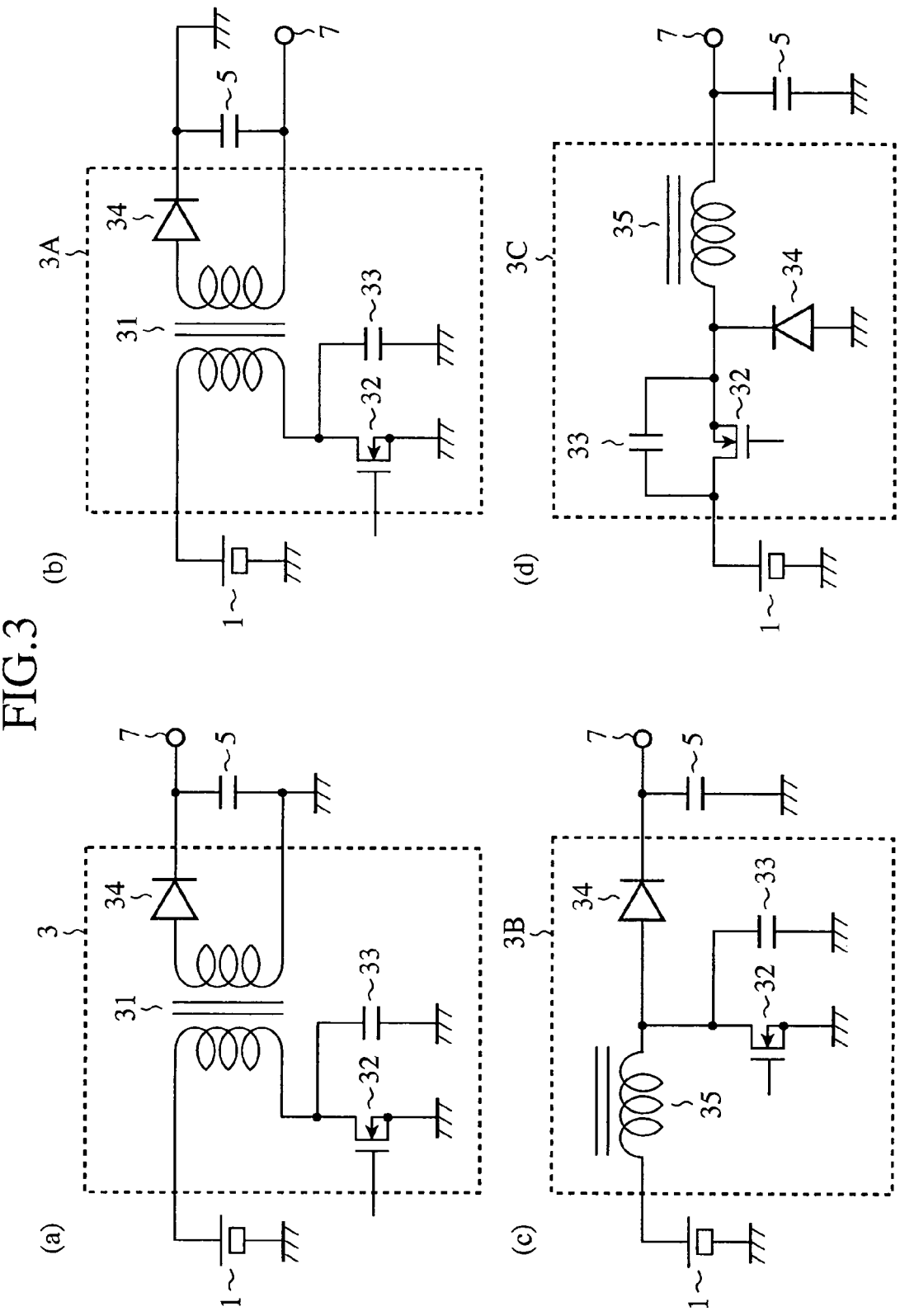
FIG. 3a-3d show views for illustrating applications of the DC/DC converter device according to the first embodiment of the present invention.

FIG. 3 shows the embodiment applicable to a step-up/step-down transformer or a choking coil, substantially by using other examples of the DC/DC converter device in FIG. 1 above.

Referring to FIG. 3, FIG. 3(*a*) shows a case where a DC/DC converter 3 is of the transformer type (step-up) as in the case of FIG. 1, and an increased voltage is applied to a load 7 from the DC/DC converter 3. Further, FIG. 3(*b*) shows a case of a DC/DC converter 3A that is of the transformer type (reverse) opposite in direction to that of FIG. 1. In this case, the node between the cathode of a diode 34 of which the anode is connected with one side of a secondary winding of a transformer 31 and one end of a capacitor 6 is grounded; the node between the other side of the secondary winding of the transformer 31 and the other end of the capacitor 6 is connected with the load 7; and a reversed voltage is applied to the load 7 from the DC/DC converter 3A. Other structure thereof is the same as that of FIG. 3(*a*).

Moreover, FIG. 3(*c*) shows a case of a choking coil type (step-up) DC/DC converter 3B, where a choking coil 35 is substantially employed in place of the transformer 31 of the DC/DC converter 3 shown in FIG. 3(*a*). The choking coil 35 is provided between the positive side of a battery 1 and the anode of a diode 34; the anode side of the diode 34 is grounded through a switching element 32 and a capacitor 33 connected thereto in parallel; and the cathode side of the diode 34 is grounded through a capacitor 6, and is connected to a load 7.

Further, FIG. 3(*d*) shows a case of a choking coil type (step-down) DC/DC converter 3C, where a choking coil 35 is substantially employed in place of the transformer 31 of the DC/DC converter 3A shown in FIG. 3(*b*). One side of the choking coil 35 is connected with the positive side of a battery 1 through a switching element 32 and a capacitor 33 connected to each other in parallel, and is grounded through a reverse-biased diode 34. The other side of the choking coil 35 is grounded through a capacitor 6, and is connected to a load 7.

As mentioned above, according to the present embodiment, ripple can be reduced on both the output and input of a converter, the capacitance of a capacitor for a filter can be reduced, and further, the noise generated by the ripple can be lowered by resonantly operating DC/DC converters at the same frequency with a phase shift (preferably with a phase difference of 180° in the case of two DC/DC converters in parallel) by means of driving a plurality of DC/DC converters in parallel.

Moreover, since a switching element is turned on/off when the voltage applied to the switching element is 0 V, or the current applied thereto is 0 A by the resonant operation of DC/DC converters, the switching loss can be reduced, the steep change in voltage and current caused by the switching is loosened, and furthermore, the noise generated by the steep change can be reduced. In addition, the embodiment can be applied to step-up/step-down transformers or choking coils.

Second Embodiment

Figure 4:
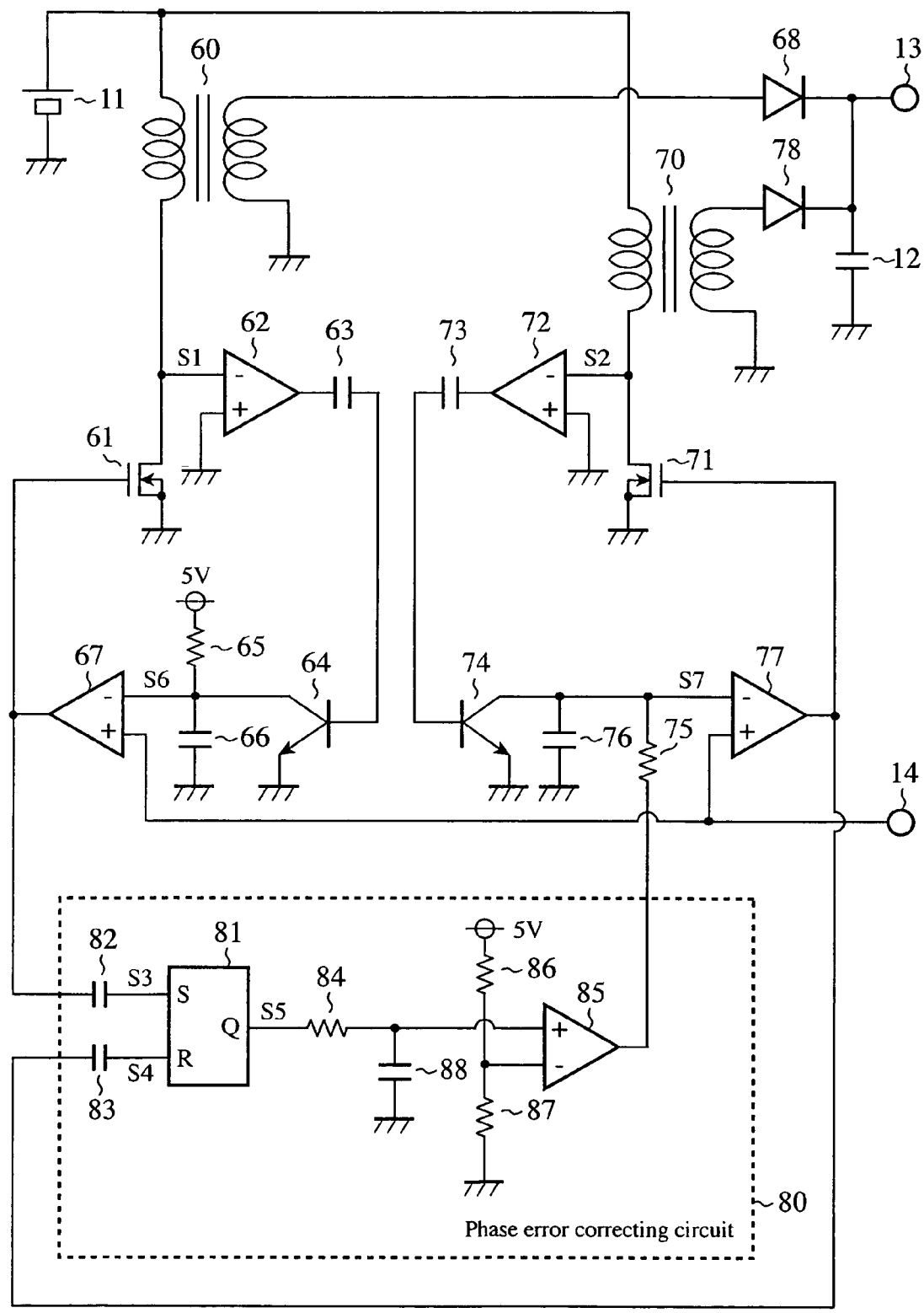
FIG. 4 is a block diagram showing a DC/DC converter device according to the second embodiment of the present invention.

FIG. 4 is a block diagram showing a DC/DC converter device according to the second embodiment of the present invention, in which a PLL circuit where the operating phase of the DC/DC converter is maintained in a predetermined phase is constructed.

Referring to FIG. 4, one side of the primary winding of a transformer 60 is connected with the positive side of a battery 11; and the other side thereof is connected with the positive electrode side of a switching element 61, and is connected with the inverting input terminal of a comparator 62. The non-inverting input terminal of the comparator 62 is grounded; the output terminal thereof is connected with the base of a transistor 64 through a capacitor 63; the emitter of the transistor 64 is grounded; the collector thereof is connected with the node between a resistor 65 and a capacitor 66 connected in series between the power source of 5 V and the ground; and the node is connected with the inverting input terminal of the comparator 67. The non-inverting input terminal of the comparator 67 is connected with a voltage input 14 for output power adjustment, and the output terminal of the comparator 67 is connected with the gate terminal of the switching element 61. Further, one side of the secondary winding of the transformer 60 is connected with the output terminal 13 of the device through a diode 68, and the other side of the secondary winding of the transformer 60 is grounded.

Furthermore, one side of the primary winding of a transformer 70 is connected with the positive side of the battery 11; and the other side thereof is connected with the positive electrode side of a switching element 71, and is connected with the inverting input terminal of a comparator 72. The non-inverting input terminal of the comparator 72 is grounded; the output terminal thereof is connected with the base of a transistor 74 through a capacitor 73; the emitter of the transistor 74 is grounded; and the collector thereof is connected with the output side of a phase error correcting circuit 80 serving as a phase error correcting means through a resistor 75, is simultaneously grounded through a capacitor 76, and is connected with the inverting input terminal of a comparator 77. The non-inverting input terminal of the comparator 77 is connected with the voltage input 14 for output power adjustment, and the output terminal of the comparator 77 is connected with the control electrode of the switching element 71. Besides, one side of the secondary winding of the transformer 70 is connected with the output terminal of the device through a diode 78, and the other side of the secondary winding of the transformer 70 is grounded.

The phase error correcting circuit 80 has a flip-flop circuit 81 and an operational amplifier 85; the set terminal S of the flip-flop circuit 81 is connected with the output terminal of the comparator 67 through a capacitor 82; and the reset terminal of the comparator is connected with the output terminal of the comparator 77 through a capacitor 83. Further, the output terminal of the flip-flop circuit 81 is connected with the non-inverting input terminal of the operational amplifier 85 through a resistor 84. To the inverting input terminal of the operational amplifier 85, is connected the node between the resistor 65 and the capacitor 66 connected in series between the power source of 5 V and the ground (voltage for comparison becoming one-half of the 5 V power source); and a capacitor 88 is connected between the non-inverting input terminal of the operational amplifier 85 and the ground.

Additionally, in FIG. 4, the portion from the transformer 60 to the diode 68 virtually constitutes one DC/DC converter, and the portion from the transformer 70 to the diode 78 virtually constitutes the other DC/DC converter.

The operation will now be described with reference to timing charts shown in FIGS. 5 and 6.

According to the present embodiment, the operation of one DC/DC converter is used as the reference, and the other DC/DC converter is caused to follow the former in operating frequency and phase. FIG. 5 shows the case where the phase of the DC/DC converter constituted by the portion from the transformer 60 to the diode 68 is in the advanced phase relative to that of the DC/DC converter constituted by the portion from the transformer 70 to the diode 78. FIG. 6 shows the case where the phase of the DC/DC converter constituted by the portion from the transformer 60 to the diode 68 is in the retarded phase with respect to that of the DC/DC converter constituted by the portion from the transformer 70 to the diode 78.

Figure 5:
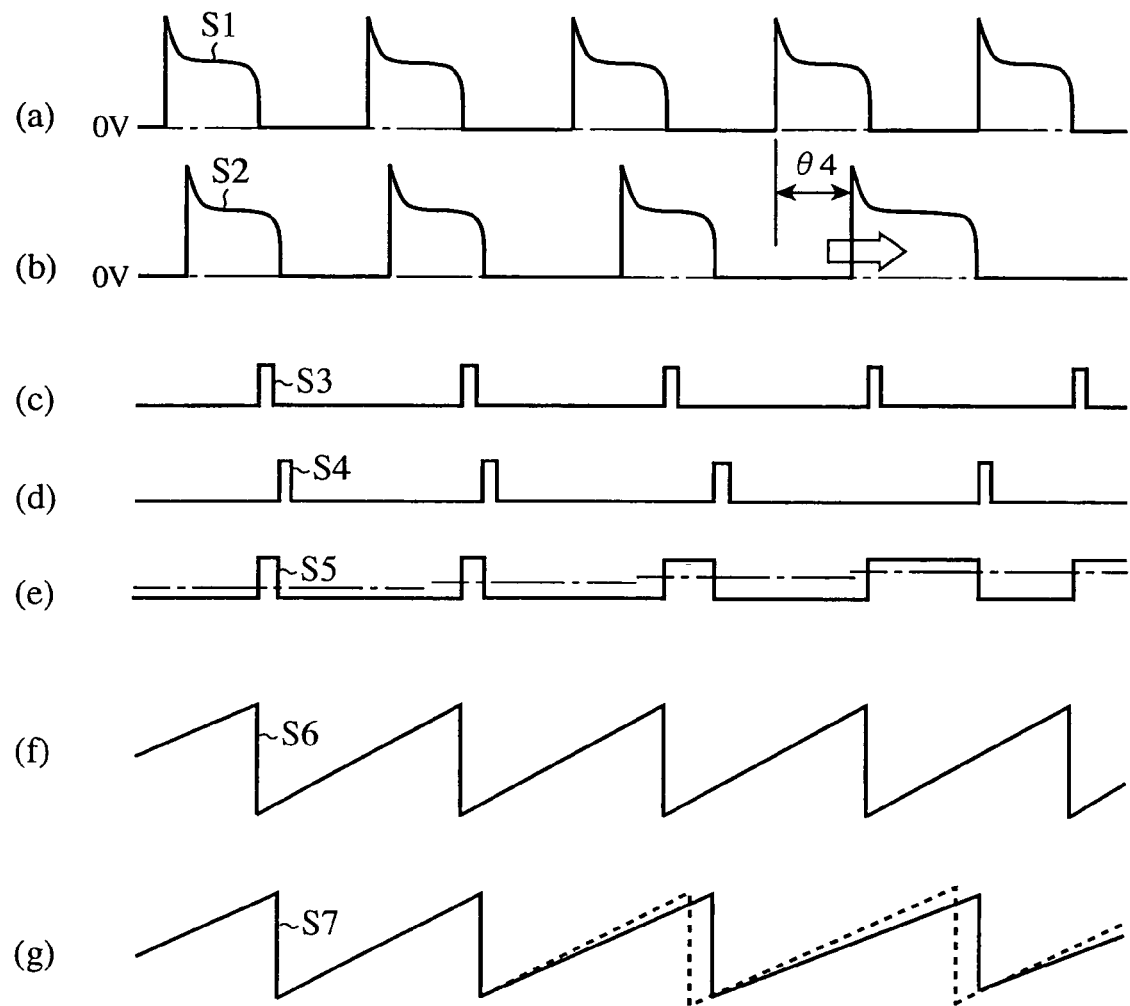
FIG. 5a-5g shows timing charts for explaining an operation of the DC/DC converter device according to the second embodiment of the present invention.

First, in FIG. 5, signal S1 as shown in FIG. 5(*a*) is applied to the inverting input terminal of the comparator 62 from the primary side of the transformer 60, and similarly, signal S2 as shown in FIG. 5(*b*) is applied to the inverting input terminal of the comparator 72 from the primary side of the transformer 70. The comparators 62, 72 compare the signals S1, S2 applied to their inverting input terminals, respectively, with the ground potentials of their non-inverting input terminals, and supply the comparison results to the transistors 64, 74 through their capacitors 63, 73, respectively. The transistors 64, 74 are turned on when the output of the comparators 62, 72 rises, respectively. As a result, signals S6, S7 as shown in FIG. 5(*f*) and FIG. 5(*g*) are input to the inverting input terminals of the comparators 67, 77, respectively. The output of the comparators 62, 72 is applied to the gate terminals of the switching elements 61, 71, respectively.

In addition, the output of the comparators 62, 72 is applied to the set terminal S and the reset terminal R of the flip-flop circuit 81 through the capacitors 82, 83, respectively, as the pulse signals S3, S4 as shown in FIG. 5(*c*) and FIG. 5(*d*), respectively. Further, pulse signal S5 as shown in FIG. 5(*e*) is output from the output terminal Q of the flip-flop circuit 81, and is supplied to the non-inverting input terminal of the operational amplifier 85. The capacitor 76 is charged by the comparison result voltage of the operational amplifier through the resistor 75; signal S7 is generated; and the signal S7 is supplied to the inverting input terminal of the comparator 77.

Accordingly, in this case, the average voltage of the pulse signal S5 supplied to the non-inverting input terminal of the operational amplifier 85 is low as shown by the alternate long and short dash lines in FIG. 5(*e*). As a result, the charged power source of the capacitor 76 supplied through the resistor 75 is small, and the rising of the signal S7 supplied to the inverting input terminal of the comparator 77 becomes sluggish as shown by the dashed lines in FIG. 5(*g*) to substantially extend the cycle. For this reason, the phase retardation of phase angle θ4, as shown in FIG. 5(*b*), of the signal S2 relative to the signal S1 is carried out by the phase error correcting circuit 80.

Figure 6:
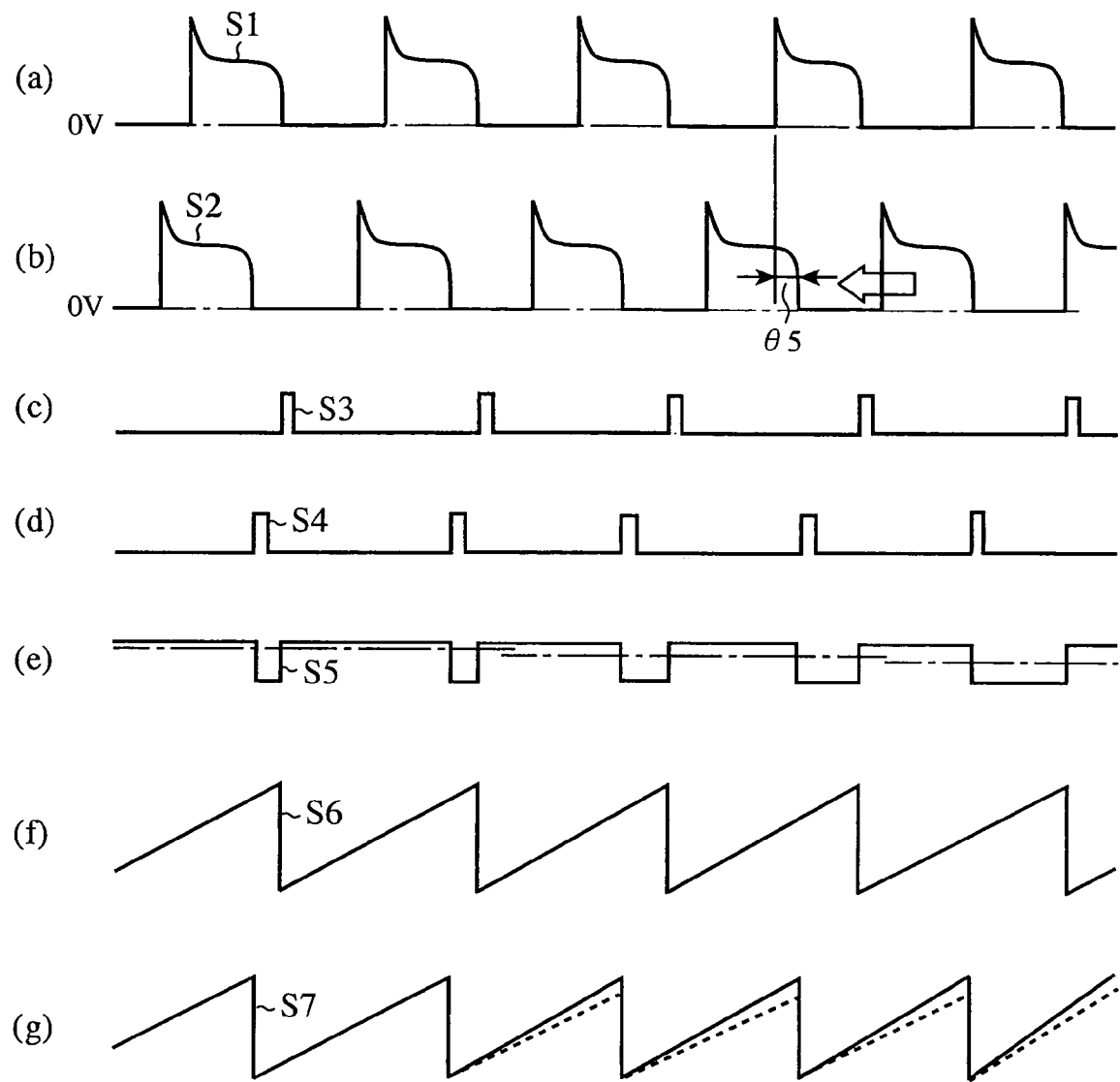
FIG. 6a-6g shows timing charts for explaining an operation of the DC/DC converter device according to the second embodiment of the present invention.

Then, in FIG. 6, signal S1 as shown in FIG. 6(*a*) is applied to the inverting input terminal of the comparator 62 from the primary side of the transformer 60, and similarly, signal S2 as shown in FIG. 6(*b*) is applied to the inverting input terminal of the comparator 72 from the primary side of the transformer 70. The comparators 62, 72 compare the signals S1, S2 applied to their inverting input terminals, respectively, with the ground potentials of their non-inverting input terminals, and supply their rising output to the transistors 64, 74 through the capacitors 63, 73, respectively. The transistors 64, 74 are turned on when the output of the comparators 62, 72 rises, respectively. As a result, signals S6, S7 as shown in FIG. 6(*f*) and FIG. 6(*g*) are input to the inverting input terminals of the comparators 67, 77, respectively. The output of the comparators 62, 72 is input to the gate terminals of the switching elements 61, 71, respectively.

In addition, the output of the comparators 62, 72 is applied to the set terminal S and the reset terminal R of the flip-flop circuit 81 through the capacitors 82, 83, respectively, as the pulse signals S3, S4 as shown in FIG. 6(*c*) and FIG. 6(*d*), respectively. Then, pulse signal S5 as shown in FIG. 6(*e*) is output from the output terminal Q of the flip-flop circuit 81, and is supplied to the non-inverting input terminal of the operational amplifier 85. The capacitor 76 is charged by its comparison result voltage through the resistor 75; signal S7 is generated; and the signal S7 is supplied to the inverting input terminal of the comparator 77.

Therefore, in this case, the average voltage of the pulse signal S5 supplied to the non-inverting input terminal of the operational amplifier 85 is high as shown by the alternate long and short dash lines in FIG. 6(*e*). As a result, the charging current supplied to the capacitor 76 through the resistor 75 is large. The rising of the signal S7 supplied to the inverting input terminal of the comparator 77 is steep as shown by the dashed lines in FIG. 6(*g*), and since the cycle is substantially shortened, a phase advancement of phase angle θ5, as shown in FIG. 6(*b*), of the signal S2 relative to the signal S1 is carried out by the phase error correcting circuit 80.

As mentioned above, according to the present embodiment, the flip-flop circuit 81 having the input terminals to which the different operating signals of DC/DC converter are input is employed, and the DC/DC converter following the other is controlled such that the output duty of the flip-flop circuit 81 becomes 50% (the voltage for comparison corresponding to the average output voltage of the flip-flop voltage=one-half of the voltage of the 5 V power source). In other words, the two DC/DC converters maintain each other's operating frequencies and the phase deference to each other by means of PLL operation where two operating signals of DC/DC converter are input to two input terminals (set terminal S and reset terminal R) of the flip-flop circuit 81, respectively, and the charging time of the capacitor 76 for generating a triangular wave of the following DC/DC converter, is changed such that the duty of the output of the flip-flop circuit 81 becomes 50% (the both are shifted 180°, thus alternately operating). That is, for the operation of one DC/DC converter as a reference, when the operating frequency and phase of the other DC/DC converter follow that of the former, i.e. the one DC/DC converter, the operating frequencies of both the DC/DC converters can become substantially the same, and a phase difference of approximately 180° can be maintained.

The employment of the above-described DC/DC can reduce a switching loss, ease steep changes in voltage and current caused by switching, and decrease noise generated by the steep changes.

It should be noted that the circuit configuration employed for the above explanation is the one for explaining the operation of the DC/DC converters. It may be constructed by employing other circuit configurations performing a similar operation such as digital circuit configurations or other circuit configurations using processes by microcomputers or the like.

Third Embodiment

Figure 11:
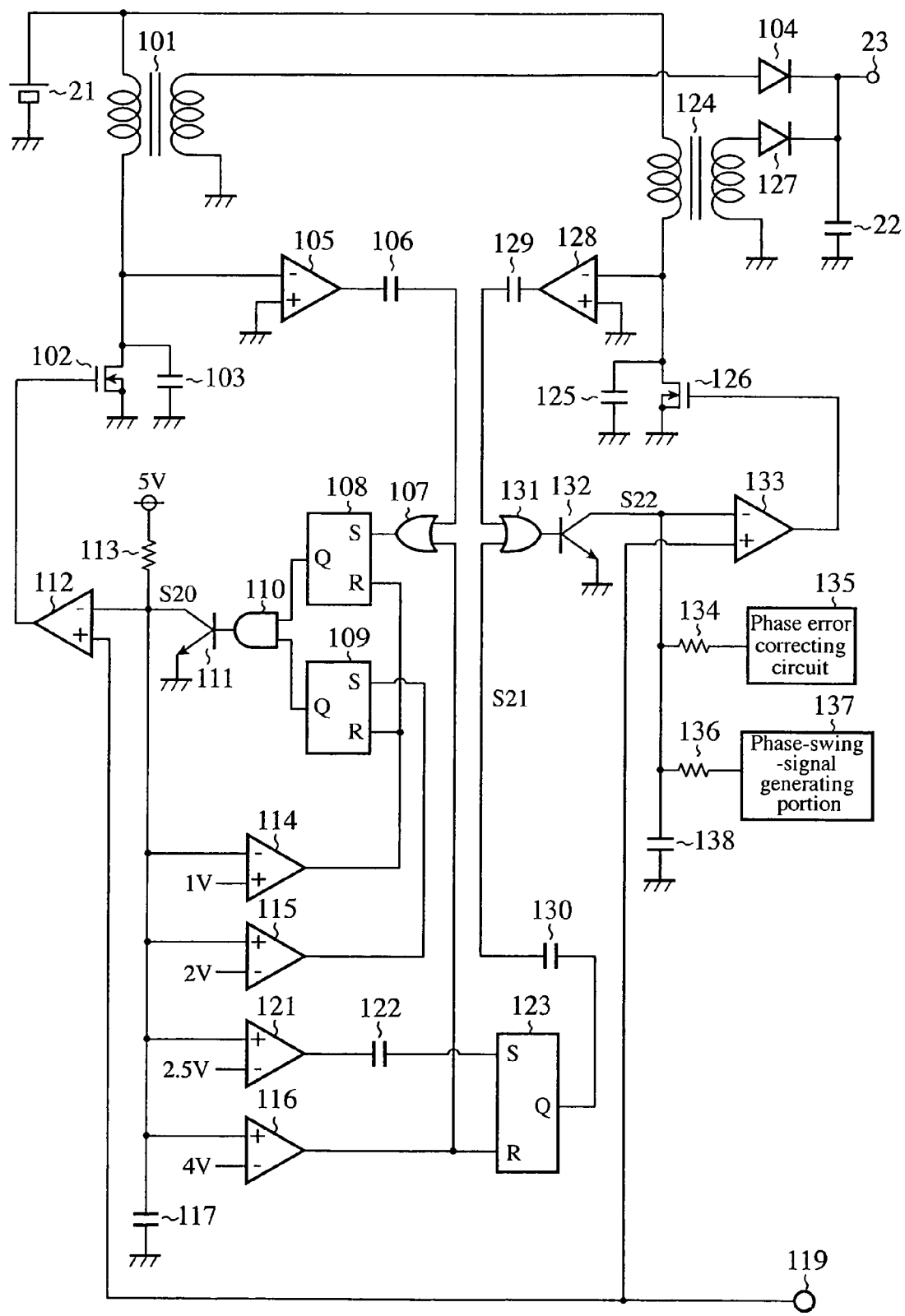
FIG. 11 is a block diagram showing the discharge lamp lighting device using the DC/DC converter device according to the third embodiment of the present invention.

FIG. 11 is a block diagram showing a DC/DC converter device according to the third embodiment of the present invention. The embodiment is virtually the case where the DC/DC converter device according to the present invention is specially applied to an electric-discharge lamp lighting device.

Figure 7:
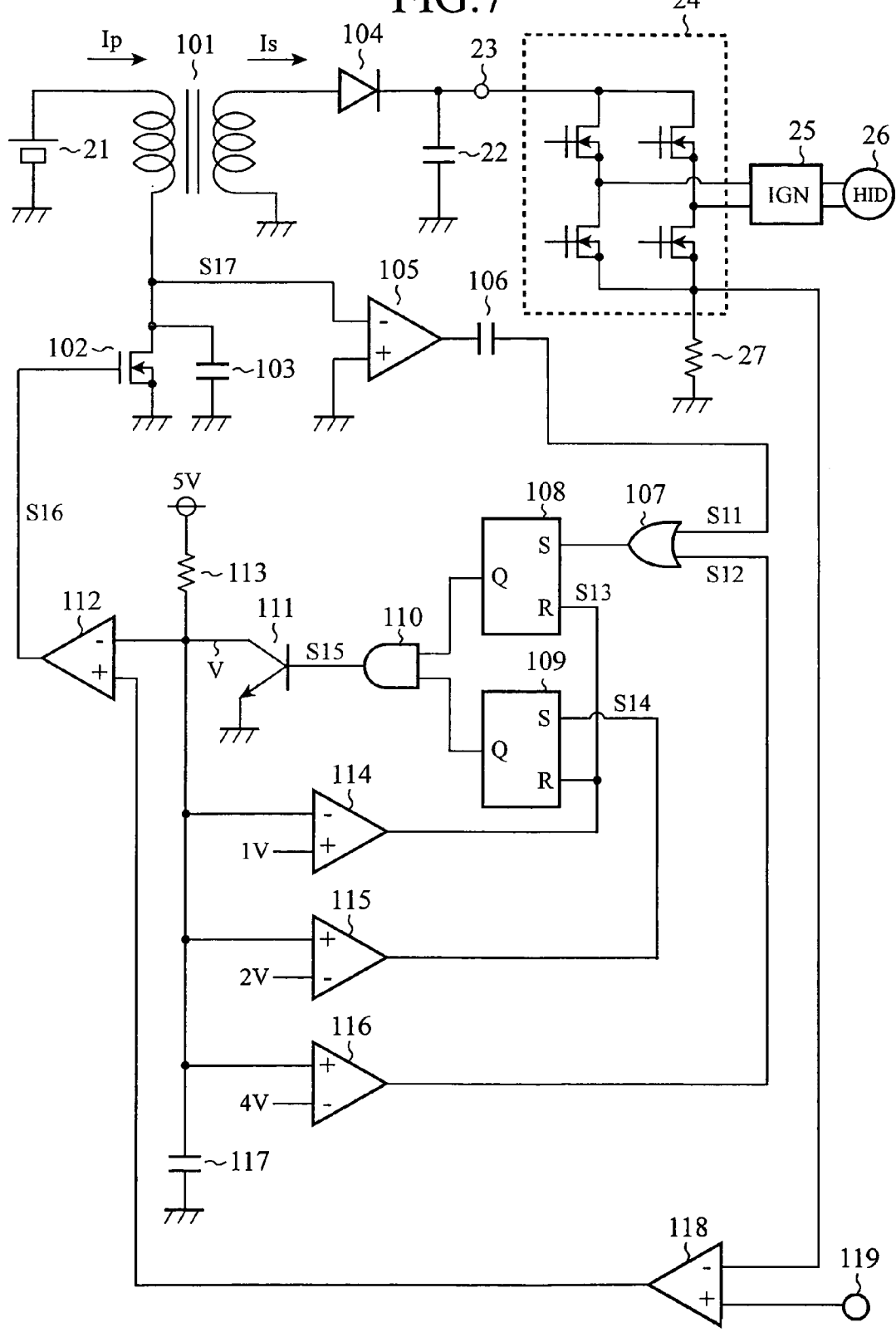
FIG. 7 is a block diagram showing a DC/DC converter on one side, for explaining an operation of a discharge lamp lighting device using a DC/DC converter device according to the third embodiment of the present invention.

FIG. 7 is used for explaining the operation of the circuit shown in FIG. 11, and shows one side of the circuit shown in FIG. 11. Referring to FIG. 7, one side end of the primary winding of a transformer 101 is connected to a battery 21, and the other end of the primary winding of the transformer 101 is connected with the positive electrode (drain terminal) side of a switching element 102, and is grounded through a capacitor 103.

Further, one side of the secondary winding of the transformer 101 is connected with a capacitor 22 through a diode 104, and is connected with an H type bridge circuit 24 consisting of four switching elements connected in parallel via a node 23 to which output current is supplied by the other circuit. An igniter circuit (IGN) 25 serving as an ignition means and a high-intensity discharge lamp (HID) 26 are connected to the output side of the H type bridge circuit 24. Then, one end of the H type bridge circuit 24 is grounded through a resistor 27.

Furthermore, the other end of the primary winding of the transformer 101 is connected with the inverting input terminal of a comparator 105; the output side of the comparator is connected with one input terminal of an OR circuit 107 through a differential capacitor 106; the output terminal of the OR circuit is connected with the set terminal S of a flip-flop circuit 108; and the output terminal Q of the flip-flop circuit 108 is connected with one input terminal of an AND circuit 110. The output terminal of the AND circuit 110 is connected with the base of a transistor 111 of which the emitter is grounded; the collector of the transistor is connected with the inverting input terminal of a comparator 112 and is connected with a 5 V power-source through a resistor 113; and the output terminal of the comparator 112 is connected with the gate terminal of the switching element 102.

Besides, the collector of the transistor 111 is grounded through a capacitor 117, and is connected with the inverting input terminal of a comparator 114 and the non-inverting input terminals of comparators 115, 116. The output terminal of the comparator 114 is connected with the reset terminal R of the flip-flop circuits 108, 109; the output terminal of the comparator 115 is connected with the set terminal S of the flip-flop circuit 109; and the output terminal of the comparator 116 is connected with the other input terminal of the OR circuit 107. By way of example, a voltage of 1 V is applied to the non-inverting input terminal of the comparator 114, while voltages of 2 V, 4 V are applied to the inverting input terminals of the comparators 115, 116, respectively. Additionally, the output terminal Q of the flip-flop circuit 109 is connected with the other input terminal of the AND circuit 110. Further, a reference value 119 for control is applied to the non-inverting input terminal of an error amplifier 118, and the output terminal of this amplifier is connected with the non-inverting input terminal of the comparator 112.

Note that a voltage input for adjusting the output power is input to a terminal 119.

The operation thereof will now be described with reference to the timing charts shown in FIGS. 8-10. When lighting the discharge lamp 26, a high voltage should be applied for the interelectrode voltage of the discharge lamp 26 in the state where current does not flow immediately before start-up of the lamp (breakdown).

At that time when the load on the DC/DC converters is extremely light, it is necessary to shorten the ON time of the switching element 102 as compared to at the time of steady lighting operation at rated voltage so as not to accumulate magnetic energy in the DC/DC converters. At that timing, if the DC/DC converters are caused to carry out resonant operation, the frequency becomes two times or more than at the time of steady lighting operation; however, the operation at high frequency is not preferable because the loss of the switching element 102 is increased.

Therefore, in order not to impose a large load on the switching element 102 at that timing, it is necessary to operate the DC/DC converters in a general discontinuous mode (the upper limit frequency at which resonant operation is possible is made fixable). At that timing just before lighting, the operating frequencies of the DC/DC converters are fixed to interrupt their resonant operations.

Subsequently, the discharge lamp 26, immediately after start of lighting (breakdown), requires longer time than at the time of steady lighting operation at rated voltage, to discharge the magnetic energy accumulated in the DC/DC converters due to its low interelectrode voltage. Still more, immediately after lighting, in order to rapidly increase the amount of light emission, it is necessary to lengthen the ON time of the switching element 102 to cause the DC/DC converters to output high power.

Accordingly, at that timing, if the DC/DC converters are caused to carry out resonant operation, the frequency becomes one-half or less than at the steady lighting; however, the operation thereof at a low frequency disadvantageously involves the upsizing of the transformer 101.

In order to meet the operation at that timing by the small transformer 101 of limited size, it is required to operate the DC/DC converters in a general continuous mode (the lower limit frequency at which resonant operation is possible is made fixable), and at that timing immediately after lighting, the operating frequencies of the DC/DC converters are fixed to interrupt their resonant operations.

Figure 8:
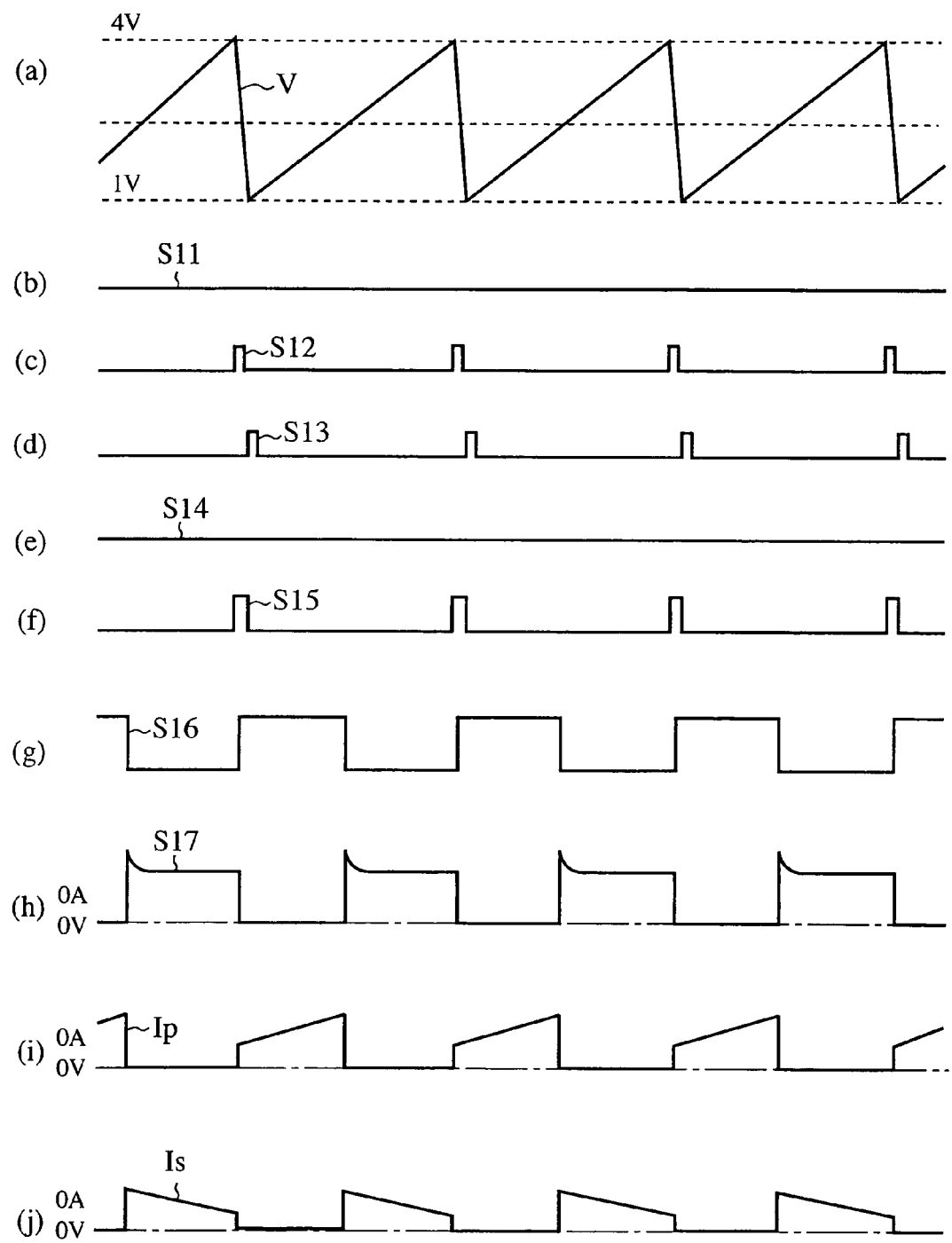
FIG. 8a-8j shows timing charts for explaining an operation of the discharge lamp lighting device using the DC/DC converter device according to the third embodiment of the present invention.
Figure 9:
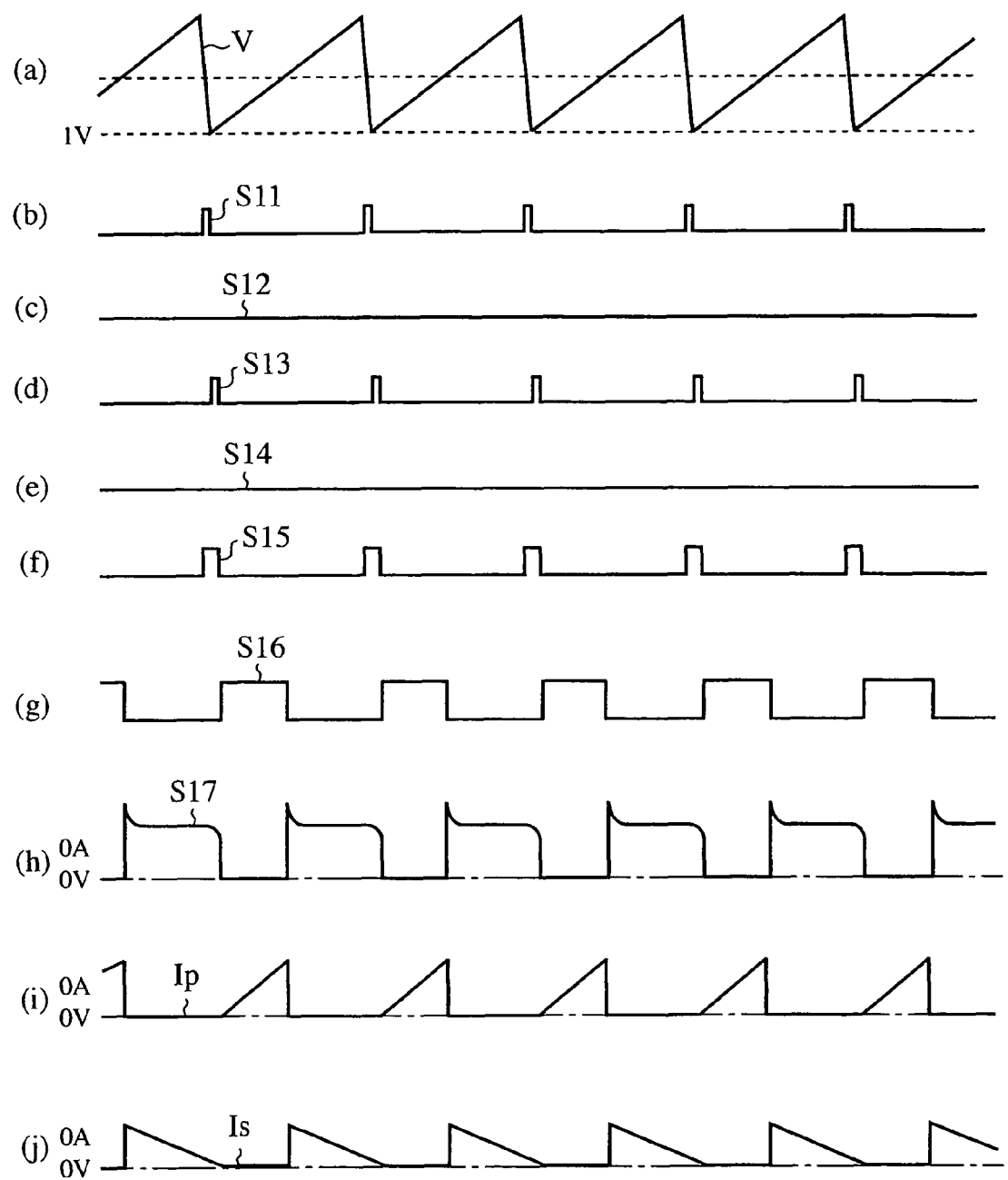
FIG. 9a-9j shows timing charts for explaining an operation of the discharge lamp lighting device using the DC/DC converter device according to the third embodiment of the present invention.
Figure 10:
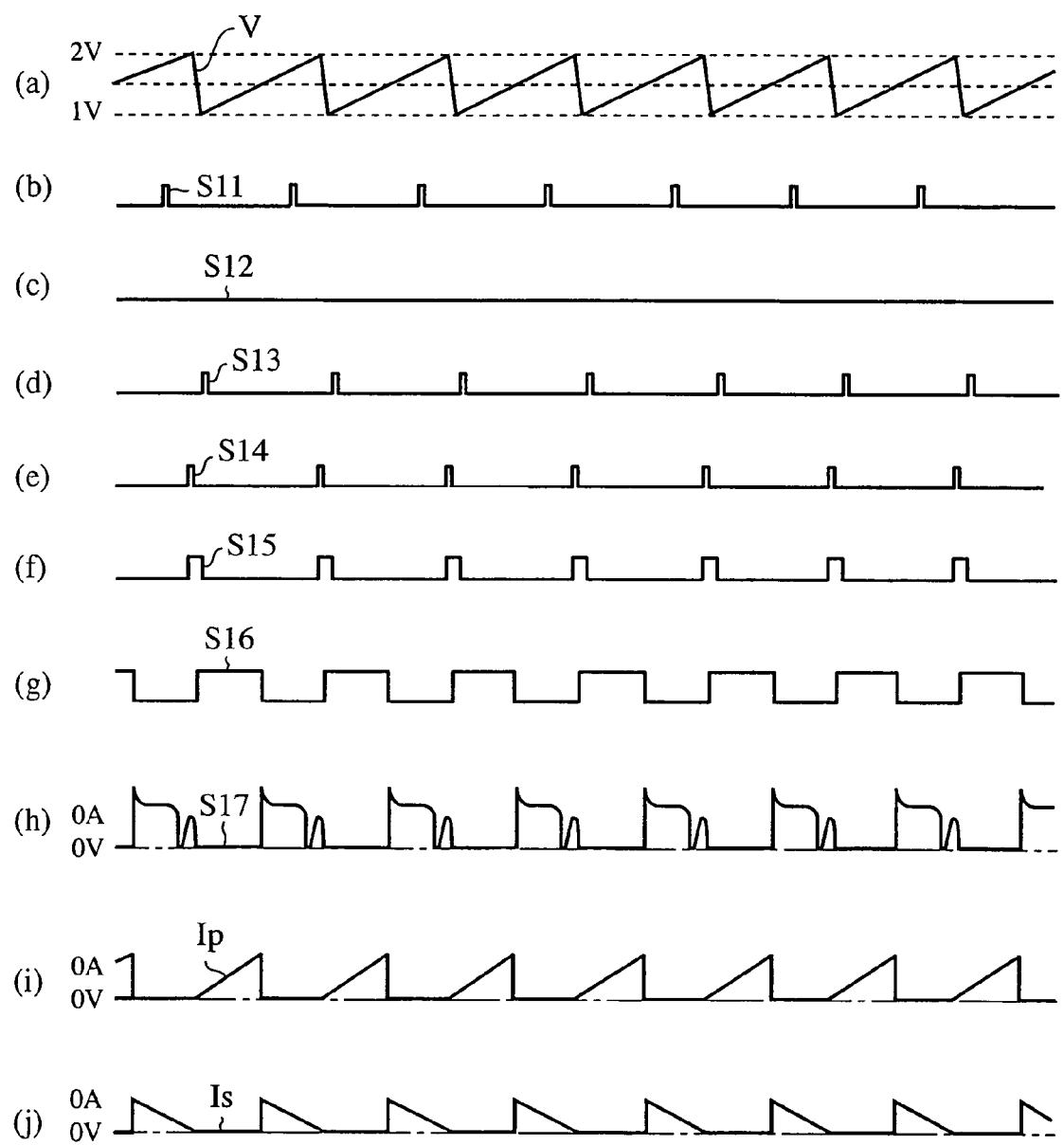
FIG. 10a-10i shows timing charts for explaining an operation of the discharge lamp lighting device using the DC/DC converter device according to the third embodiment of the present invention.

FIG. 8, FIG. 9, and FIG. 10 show the operating waveforms of the corresponding components at the time of continuous mode operation, at the time of resonant mode operation, and at the time of discontinuous mode operation, respectively. FIG. 8(a), FIG. 9(a), and FIG. 10(a) show the respective waveforms obtained on the collector side of the transistor 111. FIG. 8(b), FIG. 9(b), and FIG. 10(b) show the respective signals S11 supplied to one side of the OR circuit 107. FIG. 8(c), FIG. 9(c), and FIG. 10(c) show the respective signals S12 supplied to the other side of the same OR circuit 107. FIG. 8(d), FIG. 9(d), and FIG. 10(d) show the respective signals S13 supplied to the reset terminal R of the flip-flop circuit 108. Further, FIG. 8(e), FIG. 9(e), and FIG. 10(e) show the respective signals S14 supplied to the set terminal S of the flip-flop circuit 109.

In addition, FIG. 8(f), FIG. 9(f), and FIG. 10(f) show the respective output signals S15 of the AND circuit 110. FIG. 8(g), FIG. 9(g), and FIG. 10(g) show the respective output signals S16 of the comparator 112. FIG. 8(h), FIG. 9(h), and FIG. 10(h) show the respective signals S17 supplied to the comparator 105. FIG. 8(i), FIG. 9(i), and FIG. 10(i) show the respective currents Ip flowing from the battery 21 to the primary winding of the transformer 101. Furthermore, FIG. 8(j), FIG. 9(j), and FIG. 10(j) show the respective currents Is flowing from the secondary winding of the transformer 101 to the diode 104.

As described above, according to the present embodiment, a high-efficiency and low-noise discharge lamp lighting device can be obtained by the following manners:

At the timing immediately after lighting, the lower limit frequency at which a resonant driving is possible is made fixable, that is, the DC/DC converters is fixed in the operating frequency, and operates in a continuous mode interrupting the resonant operation; and further at the timing before lighting, the upper limit frequency at which a resonant driving is possible is made fixable, that is, the DC/DC converters is fixed in the operating frequency, and operates in a discontinuous mode interrupting the resonant operation.

FIG. 11 is a block diagram showing a DC/DC converter device according to the third embodiment of the present invention. The embodiment is substantially the case where the DC/DC converter device according to the present invention is specially applied to a discharge lamp lighting device. The parts corresponding to that of FIG. 7 are designated by similar reference numerals, and the detailed explanation is omitted.

Referring to FIG. 11, one side end of the primary winding of a transformer 101 is connected to a battery 21, and the other end of the primary winding of the transformer 101 is connected with the positive electrode (drain terminal) side of a switching element 102, and is grounded through a capacitor 103.

Further, one side of the secondary winding of the transformer 101 is connected with a terminal 23 through a diode 104.

Moreover, the other end of the primary winding of the transformer 101 is connected with one input terminal of an OR circuit 107 through a diode 120 and a capacitor 106, the output terminal of the OR circuit is connected with the set terminal S of a flip-flop circuit 108, and the output terminal Q of the flip-flop circuit 108 is connected with one input terminal of an AND circuit 110. The output terminal of the AND circuit 110 is connected with the base of a transistor 111 of which the emitter is grounded, the collector of the transistor is connected with the inverting input terminal of a comparator 112, and is connected with a 5 V power source through a resistor 113; and the output terminal of the comparator 112 is connected with the gate terminal of the switching element 102.

Furthermore, the collector of the transistor 111 is grounded through a capacitor 117, and is connected with the inverting input terminal of a comparator 114 and the non-inverting input terminals of comparators 115, 121, and 116. The output terminal of the comparator 114 is connected with the reset terminals R of the flip-flop circuits 108, 109; the output terminal of the comparator 115 is connected with the set terminal S of the flip-flop circuit 109; the output terminal of the comparator 121 is connected with the set terminal S of a flip-flop circuit 123 through a capacitor 122; and the output terminal of a comparator 116 is connected with the reset terminal R of the flip-flop circuit 123, and is connected with the other input terminal of the OR circuit 107. By way of example, a voltage of 1 V is applied to the non-inverting input terminal of the comparator 114; a voltage of 2 V is applied to the inverting input terminal of the comparator 115; a voltage of 2.5 V is applied to the inverting input terminal of the comparator 121; and a voltage of 4 V is applied to the inverting input terminal of the comparator 116. Additionally, the output terminal Q of the flip-flop circuit 109 is connected with the other input terminal of the AND circuit 110, and further, a reference value 119 for control is applied to the non-inverting input terminal of the comparator 112.

Furthermore, one side end of the primary winding of a transformer 124 is connected to the battery 21, and the other end of the primary winding of the transformer 124 is connected with the positive electrode (drain terminal) side of a switching element 126, and is grounded through a capacitor 125.

In addition, one side of the secondary winding of the transformer 124 is connected with a terminal 23 through a diode 127, and a capacitor 22 is connected between the common node between the cathodes of diodes 104, 127 and the ground.

Further, the other end of the primary winding of the transformer 124 is connected with one input terminal of an OR circuit 131 through a diode 128 and a capacitor 129; the output terminal of the OR circuit is connected with the base of a transistor 132; the collector of the transistor is connected with the inverting input terminal of a comparator 133, is connected with a phase error correcting circuit 135 and a phase-swing-signal generating portion or unit 137 through resistors 134, 136, respectively, and further is grounded through a capacitor 138. Additionally, a reference value 119 for control is applied to the non-inverting input terminal of the comparator 133, and the output terminal Q of the flip-flop circuit 123 is connected with the other input terminal of the OR circuit 131.

Figure 12:
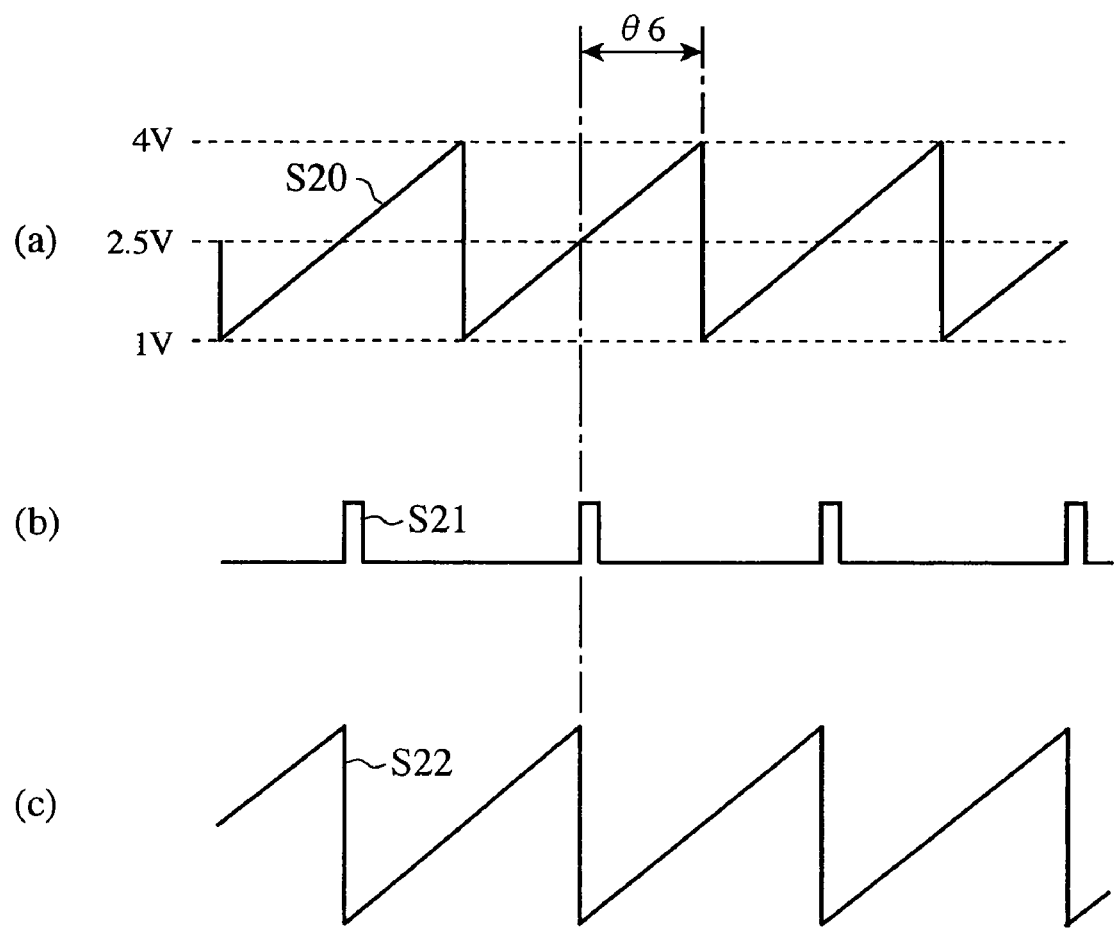
FIG. 12a-12c shows timing charts for explaining an operation of the discharge lamp lighting device using the DC/DC converter device according to the third embodiment of the present invention.

The operation will now be described with reference to timing charts shown in FIG. 12.

FIG. 12(a) shows the signal S20 obtained on the collector side of the transistor 111; FIG. 12(b) shows the signal (pulse) S21 obtained on the other input side of the OR circuit 131; and FIG. 12(c) shows the signal S22 obtained on the inverting input terminal side of the comparator 133.

When the level of the signal S20, as shown in FIG. 12(a), obtained on the collector side of the transistor 111 on the side of one DC/DC converter serving as a reference reaches 2.5 V, which is the reference voltage of the comparator 121, the flip-flop circuit 123 is set. The output of the flip-flop circuit is supplied, as the pulse 21 shown in FIG. 12(b), to the OR circuit 131 on the side of the following DC/DC converter through the capacitor 130. Thus, the transistor 132 is turned on, and then the capacitor 138 discharges electricity. Thereby, the level of the inverting input terminal of the comparator 133 is lowered as shown in FIG. 12(c), and is returned to the initial value.

As mentioned above, according to the present embodiment, also at the time of output of high power immediately after lighting, it is preferred that a plurality of DC/DC converters be alternately operated (turned on) so as to reduce the peak voltage and the peak current input to the DC/DC converters and reduce ripple. Furthermore, before lighting, in order to operate the igniter circuit (FIG. 7) for producing a dielectric breakdown between the electrodes of the discharge lamp, the production of a power source for the igniter circuit is required, and therefore, the alternate operation of a plurality of DC/DC converters is preferred.

Moreover, both the converters can alternately operate by returning the following DC/DC converter to the initial value at the midpoint of one cycle of one DC/DC converter serving as a reference. It should be appreciated that the detection of the midpoint of one cycle of the DC/DC converter serving as the reference can be achieved by detecting the time when the charged voltages of the timing capacitor 117 each rise to one-half of their maximum values with the comparator 121.

Furthermore, with the phase error correcting circuit 135, a signal is operated, correcting a phase difference $\theta 6$ coming from 2.5 V to 4 V of the signal S20 as shown in FIG. 12(a), that is, a time of period when the flip-flop circuit 123 is set and then reset, and the electrical discharge/charge of the capacitor 138 is changed, minutely swinging the drive frequency of the DC/DC converters. Alternatively, with the phase-swing-signal generating portion 137, a phase is minutely shifted, thereby swinging the frequency of the high-frequency component, and further swinging the operating frequency or the high-frequency component. In this way, frequencies causing noise are dispersed; thus, noise energy is dispersed over a wide range of frequency, not concentrated on one frequency, thereby reducing an influence exerted on other electronics.

Thus, according to the present embodiment, even when the drive frequency is fixed, the phase-shifting enables to reduce the peak voltage and peak current input to the DC/DC converters and also reduce ripple even when high power is output immediately after lighting. In addition, when the drive frequency or phase is swung within a minute range, the influence exerted by generated noise on other appliances can be reduced.

It should be understood that the circuit configuration used for the above explanation is a circuit configuration for explaining the operation of the DC/DC converter, and the operation of the DC/DC converter device may be achieved by using other circuit configurations performing a similar operation such as digital circuit configurations or other circuit configurations using processes by microcomputers or other processes.

INDUSTRIAL APPLICABILITY

As mentioned above, the DC/DC converter device and the discharge lamp lighting device according to the present invention are suitable for obtaining apparatuses, which are mounted on vehicles and so on, are excellent in the reduction of ripple and noise, and secure the lighting of high-intensity discharge lamps.

The invention claimed is:

1. A DC/DC converter device comprising:
   a plurality of resonant DC/DC converters connected in parallel;
   a timing control circuit that drives the plurality of resonant DC/DC converters at substantially the same frequency with a phase shift; and
   a phase error correcting circuit connected so as to operate synchronously with the switching operation of one of the plurality of resonant DC/DC converters to control the switching operation of the other of the plurality of resonant DC/DC converters, wherein the plurality of resonant DC/DC converters are arranged to maintain each other's operating frequencies and the phase difference to each other by the phase error correcting circuit.

2. The DC/DC converter device according to claim 1, wherein the phase error correcting circuit includes a circuit operating, in synchronization with the switching operation of a main DC/DC converter in the plurality of resonant DC/DC converters, a resonant DC/DC converter on the following side, and controls the resonant DC/DC converter on the following side such that the resonant DC/DC converter operates with a predetermined phase difference relative to the resonant DC/DC converter on the following side.

3. A discharge lamp lighting device comprising a DC/DC converter device, the DC/DC converter device comprising:
   a plurality of resonant DC/DC converters connected in parallel;
   a timing control circuit that drives the plurality of resonant DC/DC converters at substantially the same frequency with a phase shift, and
   an H-type bridge circuit and an igniter circuit that supply the electric power supplied by the DC/DC converter device to a high-intensity discharge lamp.

4. The discharge lamp lighting device according to claim 3, wherein the resonant DC/DC converters operate even in a continuous mode for a discharge lamp lighting device, and a lower limit frequency for possible resonant driving is made fixable.

5. The discharge lamp lighting device according to claim 3, wherein the resonant DC/DC converters operate even in a discontinuous mode, for a discharge lamp lighting device, and an upper limit frequency for possible resonant driving is made fixable.

6. The discharge lamp lighting device according to claim 3, wherein the resonant DC/DC converters operate in a resonant mode, as well as in a continuous mode and a discontinuous mode, for a discharge lamp lighting device, and are phase-shifted even when the drive frequency in a continuous mode and in a discontinuous mode is fixed.

7. The discharge lamp lighting device according to claim 3, wherein the resonant DC/DC converters are swung within a minute range in the drive frequency or phase.

* * * * *